3,046,297
METHOD FOR THE PREPARATION OF TRIS (2,3-DIBROMOPROPYL) PHOSPHATE

Donald E. Overbeek and Richard C. Nametz, St. Louis, Mich., assignors to Michigan Chemical Corporation, St. Louis, Mich., a corporation of Michigan
No Drawing. Filed Nov. 4, 1958, Ser. No. 771,738
13 Claims. (Cl. 260—461)

This invention relates to an improved method for the production of tris (2,3-dibromopropyl) phosphate.

Tris (2,3-dibromopropyl) phosphate is a valuable flame-proofing compound. This compound has heretofore been prepared by the direct bromination of triallyl phosphate. Thus, Examples I and V of U.S. Patent 2,574,515 describe the preparation of this compound, which it terms "hexabromo triallyl phosphate," by the addition of bromine to a solution of triallyl phosphate in benzene at a temperature of 25° C. and at room temperature, respectively. This method for the preparation of tris (2,3-dibromopropyl) phosphate is economically impractical due to the high cost of triallyl phosphate.

It is the object of this invention to provide an efficient and economically practical method for the production of tris (2,3-dibromopropyl) phosphate.

Other objects of this invention and its various advantageous features will become apparent as this description proceeds.

By the method in accordance with this invention, tris (2,3-dibromopropyl) phosphate is produced by the reaction of phosphorus oxychloride with 2,3-dibromopropanol, in the presence of an aromatic tertiary amine and an inert, volatile, organic solvent, such as, for example, benzene, petroleum ether, methylene chloride, ethylene dichloride or carbon tetrachloride. The 2,3-dibromopropanol which forms one of the raw materials for this reaction is readily prepared by the direct bromination of allyl alcohol. We have found that the aliphatic tertiary amines, such as, for example, triethylamine, reacts with 2,3-dibromopropanol to produce a quaternary ammonium salt, while the primary and secondary amines tend to react preferentially with the phosphorus oxychloride to form phosphonamides, and for these reasons are unsuitable for use in this reaction. The less basic, aromatic amines are reluctant to form quaternary salts and are generally suitable for use in this reaction. Suitable tertiary aromatic amines for use in this reaction are, for example, pyridine, α-picoline, β-picoline, γ-picoline, 2,4-lutidine, 2,6-lutidine, and quinoline.

We prefer to use pyridine as the aromatic tertiary amine and benzene as the solvent in carrying out this method. We have found that pyridine gives higher efficiencies in the reaction when using short reaction periods than the other aromatic tertiary amines which are commercially available. Benzene presents several advantages as a reaction medium in this method. It is inert to the reactants under the conditions of reaction employed in this method and is relatively inexpensive. The solubilities of both the reactants and the product in benzene are high. The solubility of pyridine hydrochloride in benzene is limited, which facilitates the removal of the pyridine hydrochloride from the reaction mixture. Benzene forms a good azeotrope with water which facilitates the recovery of the aromatic tertiary amine for reuse, by rendering effective the drying of the solution of the aromatic tertiary amine by azeotropic distillation. Further, benzene is moderately volatile, making possible its efficient recovery as well as its satisfactory removal from the product.

In carrying out this method, phosphorus oxychloride may be added to a mixture of 2,3-dibromopropanol, a tertiary amine and an inert, volatile organic solvent, while maintaining the temperature of the mixture within the range of about 0° C. to about 85° C., and preferably within the range of about 0° C. to about 60° C. The resulting reaction mixture is agitated for a period of about 1 hour to about 15 hours, the resulting organic solution of tris (2,3-dibromopropyl) phosphate is separated from the hydrochloride of the organic base and then from the volatile organic solvent, the hydrochloride of the organic base is converted back to the organic base, distilled and utilized as a reactant in the production of additional tris (2,3-dibromopropyl) phosphate.

Our research has demonstrated that the reaction between phosphorus oxychloride and 2,3-dibromopropanol and an organic base is not an instantaneous one. Further, it has demonstrated that when the reaction is not carried to substantial completion, difficulties arise from emulsification when the reaction mixture is washed with aqueous ammonia to neutralize the acid by-products formed in the production of the desired tris (2,3-dibromopropyl) phosphate. Such an emulsification causes a material reduction in the yield of this compound.

In carrying out this reaction, phosphorus oxychloride is added to a solution of 2,3-dibromopropanol and a tertiary amine in solution in an inert solvent at a rate such that the temperature of the reaction mixture does not rise above about 85° C. The solution of the 2,3-dibromopropanol and the tertiary amine is desirably agitated vigorously during the addition of the phosphorus oxychloride, as, for example, by the use of a propeller-type agitator. It is desirable to keep the reaction mixture as homogeneous as possible during the addition of the phosphorus oxychloride. We have found that this can be effectively accomplished by directing the stream of the phosphorus oxychloride at the shaft of the agitator at, or near the vortex of the liquid in the reaction vessel.

After the phosphorus oxychloride is all added to the reaction mixture, it is agitated until the reaction is completed. The time required for the addition of the phosphorus oxychloride and for the reaction to go entirely to completion depends upon the size of the batch of reactants, the exact temperature employed for the reaction and the particular aromatic tertiary amine used. The time required for the completion of the reaction can be readily determined by testing a sample of the reaction mixture to determine its tendency to emulsify when mixed with an aqueous ammonia solution. As will be brought out hereinafter, with a batch of one particular size, a period of 4–6 hours was required for the addition of the phosphorus oxychloride to a solution of 2,3-dibromopropanol and pyridine in benzene and an additional period of 4 hours was allowed for the completion of the reaction.

In carrying out this reaction, it has been found desirable to use at least one mole equivalent of an tertiary amine per mole of 2,3-dibromopropanol included in the reaction mixture. No significant difference in the reaction was detected when an excess of the tertiary amine was used. However, in practical operation we have found that it is desirable to use a slight excess of the tertiary amine to insure against any deficiency thereof in the reaction mixture. Although the reaction requires three moles of 2,3-dibromopropanol for each mole of phosphorus oxychloride, a variation of the molar ratio within the range of about 2.9 to about 3.0 moles of the 2,3-dibromopropanol per mole of phosphorus oxychloride was found to have no significant effect on the yield. However, it is usually desirable to use an excess of about 0.1%, by weight, of the phosphorus oxychloride, based on the amount of the 2,3-dibromopropanol used, to avoid any deficiency of the phosphorus oxychloride should the other materials used in the reaction mixture carry water, since the phosphorus oxychloride will react preferentially with water before it will react with the 2,3-dibromopropanol. An amount of inert solvent within the range of about 75%, by weight, to about 150%, by weight, of the 2,3-dibromopropanol contained in the reaction mixture is desirable.

During the reaction to produce tris (2,3-dibromopropyl) phosphate, the organic base reacts with the hydrogen chloride released by the reaction to form its hydrochloride with precipitates from the reaction mixture. When using pyridine as the base, pyridine hydrochloride is precipitated from the reaction mixture.

At the end of the reaction, the reaction mixture is washed with water to dissolve the precipitated hydrochloride of the amine and remove it from the tris (2,3-dibromopropyl) phosphate solution by extraction into the aqueous phase with a dilute aqueous solution of hydrochloric acid to form the hydrochloride of any unreacted tertiary amine still in the reaction mixture and extract it into the aqueous phase. These aqueous solutions are successively separated from the solution of tris (2,3-dibromopropyl) phosphate in the inert organic solvent and saved for recovering the organic base contained therein.

After the hydrochloride of the organic base and any free organic base are removed from the solution of tris (2,3-dibromopropyl) phosphate, the organic solution is neutralized by washing it with a dilute aqueous solution of ammonia. The aqueous solution of ammonia and the solution of tris (2,3-dibromopropyl) phosphate are agitated together, for example, for 30 minutes. If the mixture remains basic, the product is fully neutralized. On the other hand, if it becomes acidic after 30 minutes agitation, successive additional portions of aqua ammonia are added until the mixture remains basic.

It is in the ammonia neutralization step that difficulties are encountered from emulsification of the aqueous and the organic layers. These difficulties can best be avoided by assuring that the reaction is carried entirely to completion after the addition of the phosphorus oxychloride to the reaction mixture. The emulsion which may form is of the oil-in-water type. When such an emulsion is formed, the mixture will separate as a lower organic layer, an intermediate emulsion layer, and an upper aqueous layer. We have found that such an emulsion can be broken by the addition of more of the inert volatile organic solvent or by the addition of more aqua ammonia to the mixture. It may also be broken by prolonged agitation of the mixture following the neutralization, or by a combination of these expedients.

After the neutralization of the solution of the tris (2,3-dibromopropyl) phosphate in the inert, volatile organic solvent, and its separation from the aqueous ammoniacal phase, it is washed with water to free it of the residual ammonia and the volatile organic solvent is then removed therefrom by distillation under atmospheric pressure until a major portion of the solvent is removed from the product, followed by vacuum distillation, with a maximum temperature of about 70° C. at 20 mm. absolute pressure.

The efficient recovery and reuse of the aromatic tertiary amine in this process is the key to its economic feasibility. To recover the tertiary amine for recycling to the process, the aqueous solution of the hydrochloride of the tertiary amine recovered at the end of the reaction by which the tris (2,3-dibromopropyl) phosphate is produced, was admixed with an approximately equal volume of a volatile organic solvent for the tertiary amine. Flake caustic was then added to this mixture while maintaining its temperature at about or below 30° C. by means of brine cooling, while it is being agitated. The flake caustic was added until the pH of the mixture was within the range of 9–11, requiring about 4–6 hours. The mixture was then allowed to settle into two layers, one a solution of the tertiary amine in the volatile solvent and the other an aqueous solution of sodium chloride. These two layers were separated and the aqueous solution of sodium chloride discarded. The solution of the tertiary amine was then dried by reflux through a water trap and the volatile organic solvent and the tertiary amine distilled. The recovered distillate was a solution of the tertiary amine in the volatile organic solvent which was found suitable for recycling to the process after an adjustment was made in the concentration of the organic base contained therein.

It has been found that impurities build up in the aromatic tertiary amine which adversely affect the reaction by which the tris (2,3-dibromopropyl) phosphate is produced. For this reason, its distillation is essential to produce tris (2,3-dibromopropyl) phosphate of high quality in high yields when it is recycled in the process.

A consideration of the method in accordance with this invention can lead to the assumption that the aromatic tertiary amine which forms an essential component of the reaction mixture functions merely as an acceptor for the hydrogen chloride released by the reaction. Our research has indicated that this assumption is an oversimplification and that the aromatic tertiary amine enters into the reaction, as well as acting as an acceptor for the hydrogen chloride.

Table I presents data as to the basic strength of a series of aromatic tertiary amines.

TABLE I

*Base Constants of Aromatic Tertiary Amines in Order of Decreasing Basic Strength*

|  | $K_b$ | $pK_b$ |
|---|---|---|
| 2,4-lutidine | $6.1 \times 10^{-8}$ | 7.21 |
| 2,6-lutidine | $4.2 \times 10^{-8}$ | 7.38 |
| β-Picoline | $1.1 \times 10^{-8}$ | 7.96 |
| γ-Picoline | $1.1 \times 10^{-8}$ | 7.96 |
| α-Picoline | $9.1 \times 10^{-9}$ | 8.05 |
| Pyridine | $1.4 \times 10^{-9}$ | 8.65 |

It will be noted from the data of Table I that the aromatic tertiary amines listed there are about equal in basic strength and that all of them are strong enough to react rapidly with hydrogen chloride. On the basis of the assumption that the aromatic tertiary amine functions merely as an acid acceptor, the comparative basic strengths of these amines indicates that the rate and the efficiency of the reaction between the 2,3-dibromopropanol and the phosphorus oxychloride should be approximately the same in the presence of each of these amines.

Our research has shown that when used in the method in accordance with this invention, 2° pyridine, 2,4-lutidine and "Refined Mixed Picolines" gave approximately equivalent efficiencies when a long reaction period was utilized. Denaturing pyridine and 15° pyridine, both of which are of lower purity than 2° pyridine, gave lower efficiencies than 2° pyridine. With shorter reaction periods, 2° pyridine gave the highest efficiencies of any of the aromatic amines tested.

The structures of aromatic tertiary amines which we have compared in the method of this invention are:

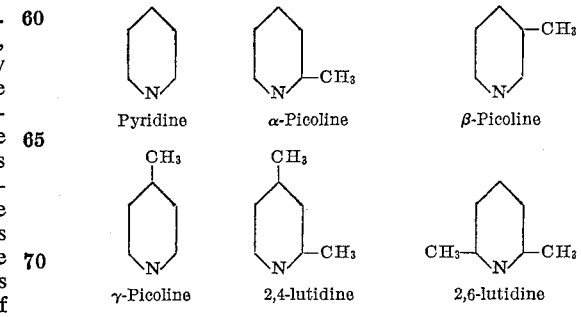

The differences in the effectiveness of the different aromatic tertiary amines in this method can be explained on the basis that they enter into the reaction with the nitrogen atom being the reactive portion of the amine. If the aromatic tertiary amine enters into the reaction, it can be reasonably expected that pyridine, β-picoline and γ-picoline would be more reactive than α-picoline, 2,4-lutidine and 2,6-lutidine, since the latter compounds are sterically hindered in their reaction by the presence of a methyl group adjacent to the nitrogen atoms. The results of our research fulfill this expectation, and hence, indicate that the amine enters the reaction.

It has been found that 2,4-lutidine is more effective than α-picoline when used in the method of this invention. Both of these amines have methyl groups adjacent their nitrogen atom. However, 2,4-lutidine has a second methyl group which has an inductive effect to render it somewhat more basic than α-picoline as shown by their constants given in Table I. This comparison indicates that there is some dependence of the effectiveness of the amine on its basicity, as well as on the steric hindrance of its structure.

These facts combined with the observation that the over-all reaction in this method is not an instantaneous one has led us to postulate that the reaction takes place in three steps, which may be represented by the following equations:

Step (1) $ROH + P(O)Cl_3 \rightarrow ROP(O)Cl_2 + HCl$
Step (2) $ROH + RO\!-\!P(O)Cl_2 \rightarrow (RO)_2P(O)Cl + HCl$
Step (3) $(ROH) + (RO)_2\!-\!P(O)Cl + amine \rightarrow$
$(RO)_3\!-\!P(O) + amine \cdot HCl$ in which R represents the $CH_2BrCHBrCH_2$ group, and that the reaction in the first and possibly the second of these steps occur rather readily, while the amine acts merely as an acceptor for the hydrogen chloride released by the reaction. The third step is believed to be the slow and difficult one in which the amine is particularly effective in actually entering into the reaction.

Having now generally explained the nature of the method in accordance with this invention, it will be specifically illustrated by the examples which follow.

EXAMPLES 1-26

PREPARATION OF TRIS (2,3-DIBROMOPROPYL) PHOSPHATE IN THE PRESENCE OF DIFFERENT AROMATIC TERTIARY AMINES

A one liter, 2-necked, round bottom flask was fitted with a "Teflon" paddle stirrer, a dropping funnel, and Y adapter to which a thermometer well extending to just above the stirrer paddle and a reflux condenser were attached. The reaction flask was charged with 327 g. (1.5 moles) of 2,3-dibromopropanol, 250 to 300 ml. of benzene and 1.5 moles of the organic amine. Table II shows the quantities of the amines used in the runs. The stirred reaction mixture was adjusted to the desired temperature by means of a Dry Ice-acetone bath or an electric heating mantle and, with continued temperature control, 76.5 g. (0.5 mole) of phosphorus oxychloride was added from the dropping funnel over a period of 20 to 40 minutes. After completion of phosphorus oxychloride addition, the reaction mixture was stirred for the length of time at the temperature, as shown for the particular example involved as listed in Tables III-VI, inclusive. The amine hydrochloride which had precipitated was removed by stirring for 10 or 15 minutes with a solution of 2.5 ml. of 6 N hydrochloric acid diluted to 100 ml. with water. This first water wash was added cautiously. In several instances, unreacted phosphorus-chlorine bonds were present which reacted quite violently with the water, sometimes in a delayed manner. The resulting water layer generally had a volume increase of 160 to 200%. A second similar wash was done. If, after stirring the second wash for 10 or 15 minutes, the pH of the water layer was not 1 as measured with pH paper, another 2 ml. of 6 N hydrochloric acid was added and stirring was continued for another 10 or 15 minutes. If the pH of the water layer was not yet 1, the process was repeated. It was deemed essential to have the second wash acidic to pH of 1, thereby assuring complete conversion of the amine to its water soluble hydrochloride. The organic layer was returned to the flask and stirred for 15 minutes with 50 ml. of 3 M ammonium hydroxide. If the resulting water layer was not found to be basic to pH of 8 or 9, another 20 ml. of 3 M $NH_4OH$ was added and the mixture was stirred for another 15 minutes. If required, additional 3 M $NH_4OH$ was added in 20 ml. portions to the end that all of the acidic components of the reaction mixture were neutralized with ammonia. The two phase mixture was separated in a separatory funnel. The organic phase was then returned to the flask and washed with 50 ml. of water. This mixture generally then separated into two layers more readily than in the preceding washing step and the volume of the recovered aqueous layer was generally greater than the original 50 ml. The wet mixture was then placed in a 500 ml., 3-necked flask equipped with a "Truebore" stirrer with a Teflon paddle, a thermometer well for following the pot temperature, and a simple distilling head leading to a condenser and receiver with a vacuum take-off. With a water aspirator the pressure was lowered slowly to between 20 and 50 mm. and the solvent was removed by distillation from the stirred mixture under reduced pressure. The flask was heated with an electric mantle so as to provide even distillation of the solvent. In order to remove the last traces of solvent the mixture was heated at 60° to 70° for about one hour at the lowest attainable pressure with the aspirator. The residue, tris (2,3-dibromopropyl) phosphate, was then weighed and assayed. The efficiencies of the reactants, none of which were used in excess, were simply the ratio of the weight of product obtained to the theoretical weight, 349.

TABLE II

*Amine Requirements in Preparation of Tris (2,3-Dibromopropyl) Phosphate*

| Amine | Molecular weight | Amount used in 0.5 mole prep. (grams) |
|---|---|---|
| Pyridine | 79.1 | 119 |
| 2,4-lutidine | 107 | 160 |
| "Refined Mixed Picolines" [1] | [2] 96.9 | 145 |
| Denaturing pyridine | | 145 |
| 15° pyridine | | 145 |

[1] "Refined Mixed Picolines" is a product of Koppers Company, Inc., and consists of 33% β-picoline, 39% α-picoline and 28% lutidine.
[2] Average molecular weight calculated on the basis of analysis given by Koppers Company, Inc.

Table III shows the reaction times and the efficiencies achieved in the production of tris (2,3-dibromopropyl) phosphate using a series of different amines at ambient temperatures.

TABLE III

*Tris (2,3-Dibromopropyl) Phosphate Preparation Efficiencies Using Various Amines at Ambient Temperature*

| Ex. No. | Amine | Reaction period (hrs.) | Efficiency,[1] percent |
|---|---|---|---|
| 1 | 2° pyridine | 15 | 90.0 |
| 2 | 2,4-lutidine | 20 | 89.5 |
| 3 | "Refined Mixed Picolines" | 21 | 89.7 |
| 4 | Denaturing pyridine | 15 | 86.7 |
| 5 | 15° pyridine | 15 | 80.3 |
| 6 | 2° pyridine | 1 | 87.6 |
| 7 | "Refined Mixed Picolines" | 1 | 82.1 |
| 8 | 2,4-lutidine | 2.3 | 71.4 |

[1] Efficiencies based on both 2-3-dibromopropanol and $POCl_3$.

It will be observed from the data of Table III that relatively high yields were obtained in Examples 1-5, inclusive, when using the long reaction periods. However, it will be noted that the 2° pyridine, 2,4-lutidine and the "Refined Mixed Picolines" used in Examples 1-3, inclusive, gave higher yields than either the denaturing pyridine or the 15° pyridine used in Examples 4 and 5, respectively. The comparison of the yield with the relatively pure 2° pyridine of Example 1 with those obtained with the denaturing pyridine of Example 4 and the 15° pyridine of Example 5 indicates that the impurities in the latter, impure grades of pyridines has an adverse effect on the efficiency of the reaction.

Still referring to Table III, it will be noted that the shorter reaction periods used in Examples 6, 7 and 8 reduced the efficiency of the reaction substantially more when using the "Refined Mixed Picolines" and 2,4-lutidine, respectively, than when using the 2° pyridine in the reaction.

In Examples 9-13, inclusive, the method of this invention was carried out using pyridine as the aromatic tertiary amine while carrying the reaction out at room temperature, utilizing varying periods of reaction. The reaction periods and the efficiencies obtained are shown in Table IV.

TABLE IV

*Preparation of Tris (2,3-Dibromopropyl) Phosphate Reaction Efficiency vs. Reaction Period Using Pyridine at Room Temperature*

| Example No. | Reaction period | Efficiency, percent |
|---|---|---|
| 9 | 10 mins | 79.4 |
| 10 | 1 hour | 87.6 |
| 11 | 3.3 hours | 88.6 |
| 12 | 15 hours | 90.0 |
| 13 | 2.5 days | 93.8 |

It will be noted from the data of Table IV, with the amounts of reactants used, that the reaction approaches maximum efficiency in about one hour, when using pyridine as the aromatic tertiary amine in the method of this invention. The almost immediate precipitation of pyridine hydrochloride in each of the reactions of these examples supports the thought hereinbefore that the first and possibly the second steps of the reaction take place rapidly, while the third and final step is considerably slower even when using pyridine as the aromatic tertiary amine in the reaction.

In Examples 14-17, inclusive, 2,4-lutidine was used as the aromatic tertiary amine in this method, while carrying the reaction out at room temperature for varying periods of time. The reaction periods and the efficiencies obtained in the examples are presented in Table V.

TABLE V

*Preparation of Tris (2,3-Dibromopropyl) Phosphate Reaction Efficiency vs. Time Using 2,4-Lutidine at Room Temperature*

| Example No. | Reaction period | Efficiency,[1] percent |
|---|---|---|
| 14 | 10 mins | 37.6 |
| 15 | 2.3 hours | 71.4 |
| 16 | 5 hours | 75.4 |
| 17 | 20 hours | 89.5 |

[1] Efficiencies based on both 2,3-dibromopropanol and phosphorus oxychloride.

The data of Table V, when compared with that of Table IV, shows that the reaction proceeds much more sluggishly in the presence of 2,4-lutidine than in the presence of pyridine. Thus, in the presence of pyridine a reaction efficiency of 79.4% was reached in ten minutes (Example 9) while in the presence of 2,4-lutidine an efficiency of only 37.6% (Example 14) was obtained in the same period of time.

In Examples 1-17, inclusive, the temperature of the reaction mixture was controlled at 0° C.-10° C. during the addition of the phosphorus oxychloride, and the reaction was continued thereafter at ambient temperature. Examples 18 and 19 show the effect of an increased temperature during the reaction period while Examples 20-24, inclusive, show the effect of the use of a higher temperature (60° C.) during the addition of the phosphorus oxychloride while keeping the reaction mixture at ambient temperature and at a higher temperature during reaction periods of varying lengths. Table VI summarizes the pertinent data of Examples 18-24, inclusive.

TABLE VI

*Preparation of Tris (2,3-Dibromopropyl) Phosphate Reaction Efficiency vs. Reaction Temperature (Pyridine)*

| Example No. | $POCl_3$ addition temperature (° C.) | Temperature after $POCl_3$ addition (° C.) | Time after $POCl_3$ addition | Reaction efficiency (percent) |
|---|---|---|---|---|
| 18 | 0-10 | 60 | 60 mins | 91.6 |
| 19 | 0-10 (⅔), 10-49 (⅓) | 60 | 60 mins | 91.2 |
| 20 | 22-30 | Ambient | 95 mins | 83.5 |
| 21 | 20-30 | Ambient | 60 mins | 82.4 |
| 22 | 29-31 | Ambient | 15 hours | 90.2 |
| 23 | 58-62 | Ambient | 15 hours | 89.4 |
| 24 | To reflux (85°) | Ambient | 2.5 days | 79.7 |

Example 18 exactly parallels Examples 10 and 12 (Table IV) except that in Example 18 the reaction mixture was kept at 60° C. for one hour, whereas in Examples 10 and 12 the reaction mixture was allowed to remain at ambient temperature for periods of one hour and 15 hours respectively. It will be noted the reaction period of one hour at 60° C. (Example 18) gave a slightly higher efficiency than was obtained in 15 hours at room temperature (Example 12).

In Example 19, two-thirds of the phosphorus oxychloride was added at 0°-10° C. and the temperature of the reaction mixture allowed to rise to 49° C. during the addition of the remaining phosphorus oxychloride, after which the reaction mixture was maintained at 60° C. for a reaction period of one hour. The high efficiency of 91.2% was achieved in this example, while obtaining the advantage of utilizing the heat evolved during the addition of the phosphorus oxychloride to warm the reaction mixture.

In Examples 20-24, inclusive, the temperature of the reaction mixture was maintained at 20° C.-62° C. during the addition of the phosphorus oxychloride instead of keeping it between 0° and 10° C. as in Examples 1-18, inclusive. An inspection of the data of Examples 20-24, inclusive, presented in Table VI shows that the addition of the phosphorus oxychloride at a temperature as high as 60° C. appears to have no degradatory effect on the reaction. However, in Example 24, in which the temperature of the reaction mixture was permitted to rise to its reflux temperature of 85° C. during the addition of the phosphorus oxychloride, the efficiency of the reaction was relatively low (79.6%) even after a prolonged reaction period of 2.5 days, showing that such a high initial temperature was definitely degradatory to the desired reaction.

In Examples 25 and 26, 2,4-lutidine was used as the aromatic tertiary amine in the method in accordance with this invention using a temperature of 60° C. during the reaction period and different periods of reaction. The pertinent data of these examples are presented in Table VII.

TABLE VII

*Preparation of Tris (2,3-Dibromopropyl) Phosphate Reaction Efficiency vs. Reaction Temperature (2,4-Lutidine)*

| Example No. | POCl₃ addition temperature (° C.) | Temperature after POCl₃ addition (° C.) | Time after POCl₃ addition (mins.) | Reaction efficiency (percent) |
|---|---|---|---|---|
| 25 | 0–10 | 60 | 60 | 76.5 |
| 26 | 0–10 | 60 | 180 | 79.0 |

The data presented by Table III showed that when using ambient temperatures during the reaction period, 2,4-lutidine did not give as high efficiencies as those obtained by the use of pyridine in the method of this invention. The data presented by Table VII shows that the increase of the temperature during the reaction period did not make a significant change in the efficiency of the reaction when using 2,4-lutidine in the reaction.

EXAMPLE 27

PILOT PLANT PRODUCTION OF TRIS (2,3-DIBROMOPROPYL) PHOSPHATE

A jacketed reactor which was cooled by circulating brine was charged with 49 gallons of benzene, 185 pounds of pyridine, and 511 pounds of 2,3-dibromopropanol to give a total reactor charge of approximately 100 gallons. While maintaining a temperature below about 35° C., 123 pounds of phosphorus oxychloride was added to the reaction vessel over a period of from 4 to 6 hours. The mixture was then agitated for an additional period of 4 hours to cause the reaction to go substantially to completion. At the end of this reaction period, the reactor contained approximately 85 gallons of a solution of tris (2,3-dibromopropyl) phosphate, and precipitated pyridine hydrochloride. This reaction mixture was washed with 10 gallons of water and then with 10 gallons of water containing 6 pounds of 37% hydrochloric acid. In each case the aqueous phase was decanted from the top of the mixture in the reactor. The first wash dissolved and removed most of the pyridine hydrochloride from the benzene solution of the tris (2,3-dibromopropyl) phosphate, while the dilute aqueous hydrochloric acid wash removed the residue of the pyridine hydrochloride, while converting any residual, unreacted pyridine to its hydrochloride and removing it. These aqueous solutions of pyridine were combined and diluted with an additional twenty gallons of water to give a total of fifty gallons of an aqueous solution of pyridine hydrochloride from which the pyridine was recovered for recycling to the next reaction batch as described below. The solution of tris (2,3-dibromopropyl) phosphate was then washed with two successive 20-gallon portions of water, decanting each from the top. The solution was then washed with 20 gallons of water to which 25 pounds of aqua ammonia had been added. If after thirty minutes of agitation the mixture was basic, the neutralization was considered complete. If the mixture became acidic, successive increments of 20 pounds of aqua ammonia, followed by 30 minutes agitation were added until the mixture remained basic. The majority of the reaction mixtures required no such successive additions of aqua ammonia. After the wash with a dilute aqueous ammoniacal solution, the mixture was allowed to settle and the aqueous phase separated by decantation from the top. The aqueous ammoniacal solution and the benzene solution of tris (2,3-dibromopropyl) phosphate tended to form a persistent emulsion during this washing operation. Normally, additional benzene or ammonia had to be added to hasten the breaking of this emulsion. It was found that an addition of either 10–20 gallons of benzene or 5–15 pounds of aqua ammonia would cause the emulsion to break within an hour. After the washing with an aqueous ammoniacal solution, the benzene solution of the tris (2,3-dibromopropyl) phosphate was given a final water wash similar to the ones described hereinbefore. The benzene was then stripped from this solution of tris (2,3-dibromopropyl) phosphate, using first a vacuum of 15 inches of mercury (absolute) and then gradually lower pressures to maintain the distillation temperature within the range of about 60 to about 65° C. After the vacuum had been reduced to 40 mm. of mercury (absolute) the temperature was raised to 78° to 80° C. until the distillation virtually ceased. The residue at 454 pounds in the still pot was the desired tris (2,3-dibromopropyl) phosphate, which, while still warm, was drained to containers. The efficiency in the production of the tris (2,3-dibromopropyl) phosphate was 83.3% based on the 2,3-dibromopropanol and the phosphorus oxychloride used.

Table VIII presents the essential data from a series of pilot plant runs which illustrates the effect utilizing a reaction period following the completion of the addition of the phosphorus oxychloride to the benzene-pyridine solution as described by Example 27.

TABLE VIII

*Pilot Plant Production of Tris (2,3-Dibromopropyl) Phosphate*

| Ex. No. | DBP[1] used, lb. | POCl₃ used, lb. | Pyridine used, lb. | NH₄OH used, lb. | Tris[2] prod., lb. | Efficiency, percent |
|---|---|---|---|---|---|---|
| 28 | 417 | 100 | 151 | 51 | 289 | 65.0 |
| 29 | 417 | 100 | 151 | 25 | 297 | 66.8 |
| 30 | 393 | 93 | 143 | 60 | 280 | 66.8 |
| 31 | 511 | 124 | 190 | 40 | 475 | 87.2 |
| 32 | 541 | 130 | 199 | 48 | 490 | 85.0 |
| 33 | 503 | 118 | 193 | 25 | 466 | 86.3 |

[1] 2,3-dibromopropanol.
[2] Tris (2,3-dibromopropyl) phosphate.

In Examples 28, 29 and 30 the reaction was stopped after all the phosphorus oxychloride had been added, while in Examples 31, 32 and 33 a reaction period of 4–6 hours was given following the addition of the phosphorus oxychloride. It will be noted from the data of Table VIII that the additional reaction period increased the efficiency in the production of the tris (2,3-dibromopropyl) phosphate from the range of 65%–66.8% to the range of 85%–87.2%.

EXAMPLE 34

PILOT PLANT RECOVERY AND RECYCLING OF PYRIDINE

The aqueous solution of pyridine hydrochloride, recovered as described by Example 27 consisting of about 50 gallons was charged to a 100 gallon brine cooled, reactor to recover the pyridine as a benzene solution suitable for recycling to the process. About 49 gallons of benzene was added to the reactor. Flake caustic (solid NaOH) was then fed to the reactor while agitating the charge and maintaining the temperature at 30° C. or lower by means of the brine cooling. A period of about 6 hours was required to add the caustic flake totaling 121 pounds necessary to bring the pH of the reaction mixture within the range of about 9 to about 11. The contents of the reactor was then permitted to settle into two layers, an upper layer consisting of a solution of pyridine in benzene which contained 2–3% by weight, of water, and a lower sodium chloride-water slurry. The lower slurry of chloride in water was drained off and discarded while making a clean separation between the two phases. The solution of pyridine in benzene was then refluxed through a water separator for about eight hours to thoroughly dry it. When dry, as evidenced by a cessation of water accumulation in the separator, the distillate was switched to the receiver and distilled until apparently complete, with a pot temperature of 120° to 125° C. at atmospheric pressure. The efficiency in the recovery of the pyridine was 83.4%. The pyridine content of the distillate was then adjusted and it was recycled to the process for use in the production of another batch of tris (2,3-dibromopropyl) phosphate.

It will be noted in Example 34 that the recovered benzene-pyridine solution was first dried by azeotropic distillation and then distilled. As noted hereinbefore, this distillation is essential in the recovery of the benzene-pyridine solution to avoid a loss of yield of tris (2,3-dibromopropyl) phosphate when the pyridine-benzene solution is recycled in the preferred embodiment of the method of this invention. Table IX compares the essential data from the production of tris (2,3-dibromopropyl) phosphate as described by Example 27, with that from the production of two other batches of the compound which were essentially identical except as to the pyridine employed.

TABLE IX

*Pilot Plant Production of Tris (2,3-Dibromopropyl) Phosphate*

| Ex. No. | DBP[1] used, lb. | POCl₃ used, lb. | Pyridine used, lb. | NH₄OH used, lb. | Tris[2] prod., lb. | Efficiency, percent |
|---|---|---|---|---|---|---|
| 27 | 511 | 123 | 185 | 25 | 454 | 83.3 |
| 35 | 511 | 122 | 185 | 20 | 462 | 84.9 |
| 36 | 511 | 122 | 187 | 25 | 308 | 56.5 |

[1] 2,3-dibromopropanol.
[2] Tris (2,3-dibromopropyl) phosphate.

In Example 27 a benzene-pyridine solution which had been recovered from the production of a prior batch of tris (2,3-dibromopropyl) phosphate as described by Example 34 was used. In Example 35 virgin pyridine was used in the benzene solution, while in Example 36 a benzene-pyridine solution was used which had been recovered as described by Example 34, except for the omission of the final distillation step. A comparison of the efficiencies in the production of the tris (2,3-dibromopropyl) phosphate shows that comparable efficiencies of 83.3% and 84.9%, were obtained in Examples 27 and 35, respectively, while in the case of Example 36 in which a recovered benzene-pyridine solution which had not been distilled was used, the efficiency was only 56.5%.

As will be appreciated from the foregoing, the method in accordance with this invention can be effectively carried out on a cyclical basis which is efficient and economical in that the only raw materials consumed in major quantities are the phosphorus oxychloride and the 2,3-dibromopropanol. Thus, in the preferred embodiment of this invention in which pyridine is used as the aromatic tertiary amine and benzene as the inert solvent, the benzene distilled to recover the product from its solution therein resulting from the reaction, is used in the recovery of the pyridine from the aqueous phase used in its separation as pyridine hydrochloride from the reaction mixture, the resulting benzene-pyridine solution distilled without separating the two components of the solution, and used in a subsequent cycle for the production of the tris (2,3-dibromopropyl) phosphate. Thus, the only benzene and pyridine, other than the initial lots required to start this cyclical process consumed in this cyclical operation are the relatively minor quantities required to compensate for the minor losses which inevitably occur in their recovery.

It will, of course, be appreciated that the method is adapted to be carried out in a cyclical manner when using an aromatic tertiary amine other than pyridine or when using an inert solvent other than benzene or both.

In the foregoing, we have given many details concerning the method in accordance with this invention and have given specific examples of reaction conditions and the efficiencies obtained when using pyridine as the organic base and benzene as the volatile, organic solvent, for the purpose of fully explaining the method. It will be understood that many changes can be made in the details given, without departing from the spirit of this invention or the scope of the following claims.

We claim:
1. The method for the production of tris (2,3-dibromopropyl) phosphate which comprises adding phosphorus oxychloride to a mixture of 2,3-dibromopropanol, an aromatic tertiary amine selected from the group consisting of pyridine, β-picoline and γ-picoline and an inert, volatile, organic solvent and separating the resulting tris (2,3-dibromopropyl) phosphate from the hydrochloride of the organic base formed by the reaction and from the inert volatile organic solvent.

2. The method for the production of tris (2,3-dibromopropyl) phosphate which comprises adding phosphorus oxychloride to an agitated mixture of 2,3-dibromopropanol, an aromatic tertiary amine selected from the group consisting of pyridine, β-picoline and γ-picoline and an inert, volatile, organic solvent, while maintaining the temperature within the range of about 0° C. to about 85° C., continuing the agitation for a period of about 1 hour to about 15 hours and separating the resulting tris (2,3-dibromopropyl) phosphate from the hydrochloride of the organic base formed by the reaction and from the inert volatile, organic solvent.

3. The method for the production of tris (2,3-dibromopropyl) phosphate which comprises adding phosphorus oxychloride to an agitated mixture of 2,3-dibromopropanol, an aromatic tertiary amine selected from the group consisting of pyridine, β-picoline and γ-picoline and an inert, volatile, organic solvent, while maintaining the temperature within the range of about 0° C. to about 85° C., continuing the agitation for a period of about 1 hour to about 15 hours and separating the resulting tri (2,3-dibromopropyl) phosphate from the hydrochloride of the aromatic tertiary amine formed by the reaction and from the inert volatile organic solvent, converting the hydrochloride of the aromatic tertiary amine back to the aromatic tertiary amine, distilling the aromatic tertiary amine and reusing the distilled aromatic tertiary amine in the production of tris (2,3-dibromopropyl) phosphate by the said method.

4. The method for the production of tris (2,3-dibromopropyl) phosphate which comprises adding phosphorus oxychloride to a mixture of 2,3-dibromopropanol, pyridine, and benzene, and separating the resulting tris (2,3-dibromopropyl) phosphate from the pyridine hydrochloride and the benzene.

5. The method for the production of tris (2,3-dibromopropyl) phosphate which comprises adding phosphorus oxychloride to an agitated mixture of 2,3,-dibromopropanol, pyridine and benzene, while maintaining the temperature within the range of about 0° C. to about 85° C., continuing the agitation for a period of about 1 hour to about 15 hours, and separating the resulting tris (2,3-dibromopropyl) phosphate from the pyridine hydrochloride and the benzene.

6. The method for the production of tris (2,3-dibromopropyl) phosphate which comprises adding phosphorus oxychloride to an agitated mixture of 2,3-dibromopropanol, pyridine and benzene, which contains about 2.9 to about 3.0 moles of the 2,3-dibromopropanol and at least 3.0 moles of pyridine per mole of phosphorus oxychloride added to the mixture, while maintaining the temperature of the mixture within the range of about 0° C. to about 85° C., continuing the agitation for a period of about 1 hour to about 15 hours, separating the resulting tris (2,3-dibromopropyl) phosphate from the pyridine hydrochloride and the benzene.

7. The method for the production of tris (23-dibromopropyl) phosphate which comprises adding phosphorus oxychloride to an agitated mixture of 2,3-dibromopropanol, pyridine and benzene, while maintaining the temperature within the range of about 0° C. to about 60° C., continuing the agitation for a period of about 1 hour to about 6 hours, and separating the resulting tris (2,3-dibromopropyl) phosphate from the pyridine hydrochloride and the benzene, coverting the pyridine hydrochloride to pyridine, distilling the pyridine and returning it to the production of tris (2,3-dibromopropyl) phosphate by the said method.

8. The method for the production of tris (2,3-dibromopropyl) phosphate which comprises adding phosphorus oxychloride to an agitated mixture of 2,3-dibromopropanol, an aromatic tertiary amine selected from the group consisting of pyridine, β-picoline and γ-picoline and an inert, volatile, organic solvent, which contains about 2.9 moles to about 3.0 moles of the 2,3-dibromopropanol and at least 3.0 moles of the aromatic tertiary amine per mole of phosphorus oxychloride added to the mixture, while maintaining the temperature of the mixture within the range of about 0° C. to about 85° C., separating the resulting hydrochloride of the aromatic tertiary amine from the solution of tris (2,3-dibromopropyl) phosphate in the inert solvent by washing the said solution with water to produce an aqueous solution of the hydrochloride of the aromatic tertiary amine, separating the said aqueous solution from the solution of the tris (2,3-dibromopropyl) phosphate in the organic solvent, distilling the inert organic solvent from the said organic solution to recover the tris (2,3-dibromopropyl) phosphate contained therein as a product, adding an alkaline material to the said aqueous solution of the hydrochloride of the aromatic tertiary amine and mixing the said aqueous solution with the said inert organic solvent to produce a solution of the aromatic tertiary amine in the inert, organic solvent, distilling the said solution of the aromatic tertiary amine in the inert, organic solvent and using the distilled solution in the production of additional tris (2,3-dibromopropyl) phosphate.

9. The method for the production of tris (2,3-dibromopropyl) phosphate which comprises adding phosphorus oxychloride to an agitated mixture of 2,3-dibromopropanol, an aromatic tertiary amine selected from the group consisting of pyridine, β-picoline and α-picoline and an inert, volatile, organic solvent which contains about 2.9 moles to about 3.0 moles of the 2,3-dibromopropanol and at least 3.0 moles of the aromatic tertiary amine per mole of phosphorus oxychloride added to the mixture, while maintaining the temperature of the mixture within the range of about 0° C. to about 85° C., separating the resulting hydrochloride of the aromatic tertiary amine from the solution of tris (2,3-dibromopropyl) phosphate in the inert solvent by washing the said solution with water to produce an aqueous solution of the hydrochloride of the aromatic tertiary amine, separating the said aqueous solution from the solution of the tris (2,3-dibromopropyl) phosphate, washing the organic solution of tris (2,3-dibromopropyl) phosphate with an aqueous solution of hydrochloric acid to separate any residual aromatic tertiary amine therefrom as its hydrochloride, separating this acid wash solution from the organic solution of the tris (2,3-dibromopropyl) phosphate, combining this acidic wash solution with the said aqueous wash solution, washing the organic solution of the tris (2,3-dibromopropyl) phosphate with aqueous ammonia to remove any acidic by-products therefrom, distilling the inert, organic solvent from the said solution to recover the tris (2,3-dibromopropyl) phosphate contained therein as a product, adding an alkaline material to the said combined aqueous solution of the hydrochloride of the aromatic tertiary amine and mixing the said aqueous solution with the said inert, organic solvent to produce a solution of the aromatic tertiary amine in the inert organic solvent, distilling the said solution of the aromatic tertiary amine in the inert, organic solvent and using the distilled solution in the production of additional tris (2,3-dibromopropyl) phosphate.

10. The method for the production of tris (2,3-dibromopropyl) phosphate which comprises adding phosphorus oxychloride to an agitated mixture of 2,3-dibromopropanol, an aromatic tertiary amine selected from the group consisting of pyridine, β-picoline and α-picoline and benzene, which contains about 2.9 moles to about 3.0 moles of the 2,3-dibromopropanol and at least 3.0 moles of the aromatic tertiary amine per mole of phosphorus oxychloride added to the mixture, while maintaining the temperature of the mixture within the range of about 0° C. to about 85° C., separating the resulting hydrochloride of the aromatic tertiary amine from the solution of tris (2,3-dibromopropyl) phosphate in the benzene by washing the said solution with water to produce an aqueous solution of the hydrochloride of the aromatic tertiary amine, separating the said aqueous solution from the benzene solution of the tris (2,3-dibromopropyl) phosphate, distilling the inert, organic solvent from the said solution to recover the tris (2,3-dibromopropyl) phosphate contained therein as a product, adding an alkaline material to the said aqueous solution of the hydrochloride of the aromatic tertiary amine and mixing the said aqueous solution with benzene to produce a benzene solution of the aromatic tertiary amine, distilling the said benzene solution of the aromatic tertiary amine and using the distilled solution in the production of additional tris (2,3-dibromopropyl) phosphate.

11. The method for the production of tris (2,3-dibromopropyl) phosphate which comprises adding phosphorus oxychloride to an agitated mixture of 2,3-dibromopropanol, pyridine and benzene, which contains about 2.9 moles to about 3.0 moles of the 2,3-dibromopropanol and at least 3.0 moles of pyridine per mole of phosphorus oxychloride added to the mixture, while maintaining the temperature of the mixture within the range of about 0° C. to about 85° C., separating the resulting pyridine hydrochloride from the benzene solution of tris (2,3-dibromopropyl) phosphate by washing the said solution with water to produce an aqueous solution of the hydrochloride of the aromatic tertiary amine, separating the said aqueous solution from the solution of the tris (2,3-dibromopropyl) phosphate, distilling the benzene from the said solution to recover the tris (2,3-dibromopropyl) phosphate contained therein as a product, adding an alkaline material to the said aqueous solution of pyridine hydrochloride and mixing the said aqueous solution with benzene to produce a solution of pyridine, distilling the said pyridine solution and using the distilled solution in the production of additional tris (2,3-dibromopropyl) phosphate.

12. The method for the production of tris (2,3-dibromopropyl) phosphate which comprises adding phosphorus oxychloride to an agitated mixture of 2,3-dibromopropanol, pyridine and benzene which contains about 2.9 moles to about 3.0 moles of the 2,3-dibromopropanol and at least 3.0 of pyridine per mole of phosphorus oxychloride added to the mixture, while maintaining the temperature of the mixture within the range of about 0° C. to about 60° C., separating the resulting hydrochloride of the aromatic tertiary amine from the benzene solution of tris (2,3-dibromopropyl) phosphate by washing the said solution with water to produce an aqueous solution of the hydrochloride of the aromatic tertiary amine, separating the said aqueous solution from the solution of the tris (2,3-dibromopropyl) phosphate, distilling the benzene from the said solution to recover the tris (2,3-dibromopropyl) phosphate contained therein as a product, adding an alkaline material to the said aqueous solution of the pyridine hydrochloride and mixing the said aqueous solution with benzene to produce a solution of the aromatic tertiary amine in benzene, separating the said benzene solution of pyridine from the aqueous phase, distilling the said solution of pyridine in benzene and using the distilled solution in the production of additional tris (2,3-dibromopropyl) phosphate.

13. The method for the production of tris (2,3-dibromopropyl) phosphate which comprises adding phosphorus oxychloride to an agitated mixture of 2,3-dibromopropanol, pyridine and benzene which contains about 2.9 moles to about 3.0 moles of the 2,3-dibromopropanol and at least 3.0 moles of pyridine per mole of phosphorus oxychloride added to the mixture, while maintaining the temperature of the mixture within the range of about 0° C. to about 60° C., separating the resulting hydrochloride of the aromatic tertiary amine from the benzene solution of tris (2,3-dibromopropyl) phosphate by washing the said solution with water to produce an aqueous solution of the hydrochloride of the aromatic tertiary amine, separating the said aqueous solution from the solution of the tris (2,3-dibromopropyl) phosphate, washing the benzene solution with an aqueous solution of hydrochloric acid to separate any residual pyridine therefrom as its hydrochloride, separating the said wash solution from the benzene solution of tris (2,3-dibromopropyl) phosphate, combining this acidic wash solution with the said aqueous wash solution, washing the said benzene solution of tris (2,3-dibromopropyl) phosphate with aqueous ammonia to remove any acidic by-products therefrom, distilling benzene from the said solution to recover the tris (2,3-dibromopropyl) phosphate contained therein as a product, adding sodium hydroxide to the said aqueous solution of the pyridine hydrochloride and mixing the said aqueous solution with benzene to produce a solution of the aromatic tertiary amine in benzene, separating the said benzene solution of pyridine from the aqueous phase, distilling the said solution of pyridine in benzene and using the distilled solution in the production of additional tris (2,3-dibromopropyl) phosphate.

References Cited in the file of this patent

UNITED STATES PATENTS

| | | |
|---|---|---|
| 2,510,876 | Engel | June 6, 1950 |
| 2,597,702 | Benning | May 20, 1952 |
| 2,678,309 | Van Gorder et al. | May 11, 1954 |
| 2,868,827 | O'Connor | Jan. 13, 1959 |

OTHER REFERENCES

Richter: Textbook of Organic Chemistry, page 246, 1938 edition, John Wiley & Sons, New York N.Y.

Kosolapoff: "Organo-Phosphorus Compounds," John Wiley & Sons, New York (1950), page 226.